United States Patent Office 3,600,465
Patented Aug. 17, 1971

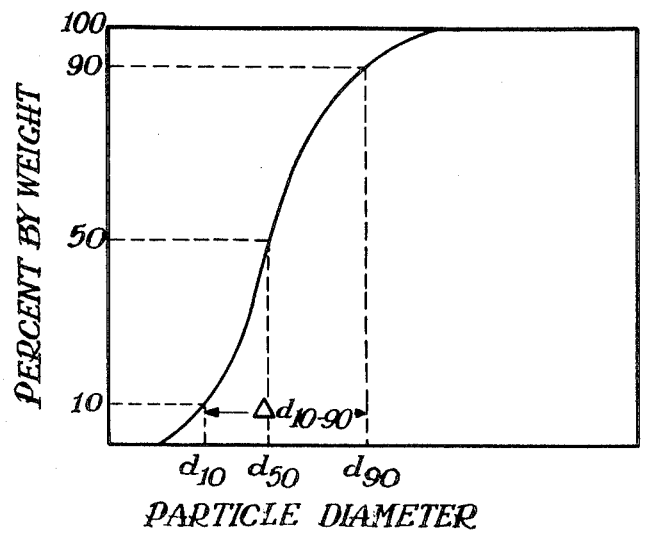

3,600,465
THERMOPLASTIC MOULDING COMPOSITIONS
Karl-Heinrich Knapp, Leverkusen, and Karl-Heinz Ott, Karl Dinges, and Werner Scholtan, Cologne-Stammheim, Germany (all % Farbenfabriken Bayer AG, Leverkusen, Germany)
Continuation of application Ser. No. 479,671, Aug. 13, 1965. This application Oct. 22, 1968, Ser. No. 769,762
Claims priority, application Germany, Oct. 7, 1964, F 44,156
Int. Cl. C08f 15/04, 15/18
U.S. Cl. 260—880       2 Claims

ABSTRACT OF THE DISCLOSURE

Thermoplastic moulding compositions from butadiene, styrene and acrylonitrile having improved notched impact strengths and prepared from 5 to 60% by weight of butadiene polymer, containing up to 30% of copolymerized monomers, and 95 to 40% by weight of polymerized styrene and acrylonitrile in a weight ratio from 90:10 to 50:50.

---

This application is a continuation of application Ser. No. 479,671 filed Aug. 13, 1965, and now abandoned.

This invention relates to a process for the production of thermoplastic moulding compositions from butadiene, styrene and acrylonitrile, of the type known as "ABS-polymers." To prepare polymers or polymer mixtures of this type, polymers which are basically hard and brittle, for example, styrene-acrylonitrile copolymers, are combined with softer polymers, for example, butadiene polymers. This may be done by mixing the two polymers or by polymerising the monomers of one polymer in the presence of the other polymer (graft polymerisation). The preparation of the components or the graft polymerisation may be carried out in bulk, in solution, in suspension or in emulsion.

There are numerous processes for preparing graft polymers in emulsion by polymerising styrene and acrylonitrile (or other monomers) in a latex of a butadiene polymer. It is known from these processes that the average latex particle size of the polybutadiene used as the starting polymer is an important factor (cf. U.S. Pat. No. 2,820,773, British Pat. No. 859,080 and Belgian patent specification No. 651,066.

These earlier processes, however, provide no information as to the significance of the latex particle size distribution of the starting polymer.

It has now been found that thermoplastic moulding compositions with improved notched impact strengths can be prepared from 5 to 60% by weight of butadiene polymer, containing up to 30% of copolymerised monomers such as styrene, isoprene or acrylonitrile, and 95 to 40% by weight of polymerised styrene and acrylonitrile in a weight ratio from 90:10 to 50:50, by polymerising the styrene and acrylonitrile, either completely or partially, in the presence of the butadiene polymer latex, in which case the quantity of the styrene and acrylonitrile polymerised in the butadiene polymer latex amounts to at least 80 parts by weight per 100 parts by weight of butadiene polymer, the remainder of the polymerised styrene and acrylonitrile optionally being added in already copolymerised form, if the starting polymer is a butadiene polymer latex which has an average latex particle diameter of $0.3\mu$ to $0.6\mu$ and a wide particle size distribution covering a range of more than $\Delta d_{10-90}=0.3\mu$, preferably of more than $\Delta d_{10-90}=0.5\mu$. The particle size data are based on measurements made with Svedberg's ultracentrifuge.

This discovery is surprising and could not be deduced from descriptions of known processes. Where, in descriptions of known processes, details are given of the preparation of the graft base (polybutadiene), the latices used as graft bases in these processes have a narrow particle size distribution.

The mechanical properties, particularly the notched impact strength, of emulsion graft polymers obtained from butadiene polymers (polybutadiene), styrene and acrylonitrile, are governed not only by the proportions in which the components are used, but also to a considerable extent by the particle size of the butadiene polymer latex used as the graft base. Butadiene polymer latices with a fairly large average particle diameter produce graft polymers with a higher notched impact strength than those with a small average particle size. This has been reported on several occasions.

Apart from the average particle size of the latex used as the graft base, however, the particle size distribution of the butadiene polymer latex employed as the graft base was surprisingly found to be a factor of considerable importance as far as the notched impact strength of the graft polymers is concerned. A butadiene polymer latex with a wide particle size distribution range produces graft polymers of greater notched impact strength than a butadiene polymer latex with a narrow particle size distribution, although both latices have the same average particle diameter.

The particles have an average size $d_{50}$ when 50% by weight of the particles have a diameter greater than $d_{50}$ and the other 50% by weight have a diameter of less than $d_{50}$. The particle size distribution is characterised by the value $\Delta d_{10-90}$, i.e. by the particle size range in which 10% to 90% of the particles lie. Measurement is inaccurate below 10% and above 90%.

FIG. 1, which is a diagrammatic integral curve of a particle size distribution range, illustrates the definition:

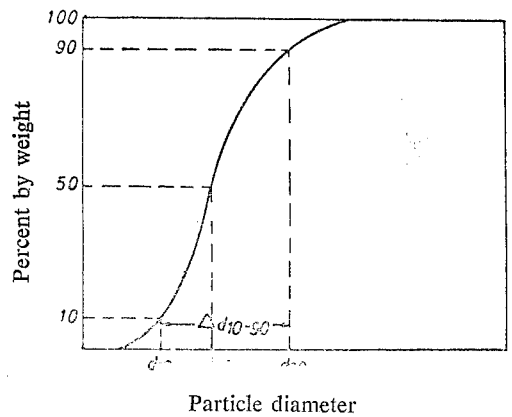

Particle diameter

The polybutadiene latices with a wide particle size distribution as used in accordance with the invention may be prepared in aqueous emulsion by known processes. Latices of pure butadiene or latices of copolymers of butadiene with other co-monomers, for example isoprene, styrene or acrylonitrile, are suitable for the purposes of this inventino.

Latices with a wide particle size distribution range are obtained by combining the measures used to form large latex particles with special agitation conditions. Measures which lead to the formation of coarsely particulate latices are, for example, the use of a water-monomer ratio of less than 1, i.e. polymerisation in concentrated emulsion; the use of relatively small quantities of emulsifier; staggering the addition of emulsifier in such a way that only part of the total quantity is added at the beginning of polymerisation, the rest being added during polymerisation, optionally in portions; and adding neutral electrolytes such as sodium chloride, potassium chloride or sodium sulphate.

The special agitation conditions referred to above are produced above all by high-turbulence agitation. A suitable agitation effect may be produced, for example, by so-called turbine impellers or by propellor agitators. Anchor agitators, gate paddle agitators and cross-blade agitators may also be employed, although their use is governed by certain conditions. Whatever type of agitator is used, the intensity of agitation which it produces, i.e. its speed of rotation, is the important factor. If agitators with a low speed of rotation are used, latices with a fairly narrow particle size distribution are obtained, whilst agitators rotating at high speed produce latices with a wide distribution range.

The following composition is an example for the preparation of the butadiene polymer latices:

| | Parts by weight |
|---|---|
| Butadiene | 100 to 70 |
| Comonomers | 0 to 30 |
| Regulators | 0.1 to 1 |
| Water | 50 to 100 |
| Emulsifier | 1 to 3 |
| (At beginning) | 0.1 to 1 |
| Potassium persulphate | 0.1 to 0.5 |

Polymerisation is preferably carried out at temperatures in the range from 50 to 70° C., although it is possible in principle to carry out polymerisation at lower temperatures when redox systems are used as the initiators. During polymerisation, the pH-value may be from 2 to 12, although a range from about 8 to 11 is preferred.

Surface-active compounds which only exhibit the properties of an emulsifier in the alkaline pH range are preferably used as the emulsifiers. Such compounds include water-soluble salts of long-chain monocarboxylic acids containing 10 to 20 carbon atoms and, in particular, the salts of disproportionated or hydrogenated abietic acid.

It is however, also possible in principle to carry out polymerisation in the presence of alkyl sulphonates or alkyl sulphates containing 10 to 20 carbon atoms, or in the presence of non-ionic emulsifiers such as the reaction products of ethylene oxide with $C_{10}$–$C_{20}$ alcohols or with substituted phenols. Mixtures of these emulsifiers may also be used.

The most suitable regulators are mercaptans with 10 to 20 carbon atoms, for example, dodecyl mercaptan.

Apart from potassium or ammonium peroxydisulphate, azo compounds such as azodiisobutyronitrile and organic peroxides such as benzoyl peroxide, tert.-butyl peroxide or cumene hydroperoxide, may in principle also be used as the polymerisation activators. Redox systems comprising one of the aforementioned peroxide compounds and a reducing agent such as sodium formaldehyde sulphoxylate, sodium metabisulphite or triethanolamine, may also be used, if desired. Small quantities of heavy metal ions, iron in particular, optionally in the presence of complex formers, may be added as co-activators.

Potassium or sodium hydroxide or alkali metal salts of ortho- or pyrophosphoric acid, may be added to regulate the pH-value.

Polymerisation of the butadiene polymer may be interrupted before the reaction is complete, although a complete reaction is preferred on economic grounds. The butadiene polymer content, i.e. the component insoluble in toluene, is from 50 to 100% and preferably above 70%. The Defo hardness is greater than 1,000. The Mooney plasticity (ML4) is from 70 to 120. Any unreacted monomers are removed from the latex by stirring under reduced pressure, by blowing them out with nitrogen or by distillation in the presence of steam.

In the case of graft polymerisation, the budiene polymer latex is diluted with water to such a concentration that the graft polymer latex to be prepared has a polymer concentration from 20 to 50%. The monomers to be grafted are introduced into the diluted latex while stirring, in which instance some more emulsifier may optionally be added.

Polymerisation of the monomers is initiated by heating them to the required polymerisation temperature and by adding a polymerisation activator.

Graft polymerisation may also be carried out by continuously introducing the monomers into the diluted butadiene polymer latex heated to the reaction temperature. The polymerisation activator and, optionally, the emulsifier may either be introduced with the butadiene polymer latex, or added to it during polymerisation. In a special embodiment of the process, addition of the monomers is so controlled that a given monomer content is maintained in the polymerising emulsion.

Another special form of the process comprises initially preparing an emulsion from the diluted butadiene polymer latex, the emulsifier, if used, and the monomers, initiating polymerisation in one part of the emulsion and adding the rest during polymerisation.

The required amount of polymerised monomers in the end product may be completely or only partly polymerised in the presence of the butadiene polymer in which case the residue, if any, may be added in already polymerised form. However, at least 80 parts by weight of monomer per 100 parts by weight of butadiene polymer should be polymerised in the presence of the butadiene polymer.

The monomers completely or partly polymerised in the presence of the butadiene polymer comprise 90 to 50% by weight of styrene and 10 to 50% by weight of acrylonitrile. The styrene may be completely or partly replaced by α-methyl styrene and/or by methyl methacrylate without any danger of losing the advantages obtained by using butadiene polymer latices of wide particle size distribution.

Graft polymerisation may be carried out at temperatures from 20 to 100° C., although temperatures in the range from 50 to 80° C. are preferred. The pH-range to be maintained during polymerisation will depend upon the emulsifier used and upon the monomers introduced. In principle, polymerisation may be carried out at pH-values in the range from 2 to 12. If emulsifiers which do not exhibit any emulsifying properties at an acidic pH are used, polymerisation is preferably carried out at pH 8 to 11. If the monomer mixture contains readily hydrolysable monomers, such as methyl methacrylate, polymerisation is carried out at pH values at or below 7.

In principle, any type of emulsifier may be used for graft polymerisation, including alkali metal or ammonium salts of monocarboxylic acids with 10 to 20 carbon atoms, of dimerised and trimerised fatty acids, of disproportionated or hydrogenated abietic acid, of alkyl sulphonic acids with 10 to 20 carbon atoms, of acid alkyl sulphates with 10 to 20 carbon atoms, of sulpho-succinic acid esters and of alkyl aryl sulphonic acids. Reaction products of alkyl phenols or aliphatic alcohols with 10 to 20 carbon atoms with ethylene oxide, as well as their sulphation products may be used alone or in combination with other emulsifiers. The type of emulsifier used is only governed by the pH value at which polymerisation is to be carried out, and by the subsequent coagulation conditions.

It is even possible to carry out graft polymerisation without any additional emulsifier provided the emulsifying effect of the emulsifier contained in the butadiene polymer latex is adequate. In this case, however, the stability of the graft polymer latex is lower. In general, the emulsifier is used in quantities from 0 to 10% by weight, preferably up to 5% by weight based on the graft polymer.

Suitable polymerisation activators for the graft polymerisation include inorganic peroxy compounds, such as potassium or ammonium peroxy disulphate, hydrogen peroxide, organic peroxides such as benzoyl peroxide, tert.-butyl peroxide or hydroperoxide, cumene hydroperoxide, p-menthane hydroperoxide, tert.-butyl perbenzoate and azo compounds such as azodiisobutyronitrile. Redox systems comprising the aforementioned peroxy compounds and reducing agents such as sodium formaldehyde sulphoxylate, sodium metabisulphite and triethanolamine, optionally in combination with very small quantities of heavy metal ions, particularly iron, and complex formers may also be used.:

The usual regulators such as dodecyl mercaptan may be used in quantities of up to 2% by weight, based on the polymer, to regulate the molecular weight, i.e. the chain length of the grafted components.

In instances where only part of the required monomers are polymerised in the presence of the butadiene polymer latex, the remainder may be polymerised by itself. In this case, polymerisation may be carried out by processes and under conditions similar to those employed in the preparation of the graft polymers. The composition of the monomer mixture of the component that is polymerised by itself may be the same as, or may differ from, that of the monomer mixture polymerised in the presence of the butadiene polymer latex.

The graft polymer may be mixed with the already polymerised monomer component via the latices, or even in solid form on mixing rolls and Banbury mixers.

The properties required of the end product govern the composition of the graft polymers or graft polymer mixtures comprising (A) 5 to 60% by weight of butadiene polymer and
(B) 95 to 40% by weight of polymerised styrene and acrylonitrile in a weight ratio of 90:10 to 50:50, in which case the styrene may be completely or partly replaced by α-methyl styrene or methyl methacrylate.

A butadiene polymer content of 5% is the lower limit at which the elasticising effect of the rubber is noticeable. The product is very hard and any increase in the butadiene polymer content is accompanied by an increase in its notched impact strength and by a decrease in its hardness. Beyond a butadiene polymer content of 60%, the polymers can only be thermoplastically processed with difficulty.

Beyond the entire range from 5 to 60% of butadiene polymer, the materials obtained from butadiene polymer latices according to the invention, of large particle size and wide particle size distribution exhibit considerably higher notched impact strength than those obtained from butadiene polymer latices of narrow particle size distribution (with the same butadiene content).

The polymers are recovered from the graft polymer latices or latex mixtures by coagulation with dilute acids for example, acetic acid or hydrochloric acid, by the addition of an electrolyte such as sodium chloride, calcium chloride, magnesium sulphate or aluminium sulphate, by concentration by evaporation or by chilling. The powdery to granular product obtained after separation by filtration or centrifuging, washing and drying is consolidated on mixing rolls, kneaders, Banbury mixers or similar apparatus, at temperatures in the range from 140 to 220° C., and is processed in the usual way to form a granulate. Dyes, pigments, lubricants or plasticisers may be added before or during this operation.

The products obtained by the process may be moulded into a variety of objects by the processes normally used to mould thermoplastic compositions. For example, the granulate may be processed in injection-moulding machines. Profiles, sheets and tubes may be manufactured by processing the granulate in extruders. The sheets may be further processed to form articles such as casings, containers and bowls, for example by vacuum-forming or by pressure-forming processes.

Apart from outstanding mechanical properties, the mouldings produced from the compositions according to the invention exhibit a high lustre.

The process as described in the foregoing is illustrated by the following examples.

EXAMPLE 1

1070 parts by weight of a 56% by weight polybutadiene latex containing 600 parts by weight of polybutadiene are diluted with 1540 parts by weight of salt-free water in a glass reaction vessel equipped with stirring mechanism, thermometer and dropping funnel.

The polybutadiene latex used has an average particle diameter $(d_{50})$ of $0.40\mu$; 10% of all the particles have a diameter of less than $0.30\mu$ and 90% a diameter of less than $1.52\mu$, i.e. the particle size distribution covers a range from $\Delta d_{10-90}=1.22\mu$ (the particle size data are based on measurements made with an ultra-centrifuge by Svedberg's method described in "Die Ultrazentrifuge" by Svedberg & Pedersen, Verlag Steinkopf, 1940, pages 249 and 300. The values for $d_{10}$, $d_{50}$ and $d_{90}$ were calculated from the weight-optical size distribution).

24 parts by weight of the sodium salt of disproportionated abietic acid, dissolved in 228 parts by weight of salt-free water, 12 parts by weight of normal sodium hydroxide and 4.8 parts by weight of potassium persulphate, dissolved in 150 parts by weight of salt-free water, are added to the diluted polybutadiene latex.

After the temperature of the mixture has been raised to 60° C., a mixture of 420 parts by weight of styrene and 180 parts by weight of acrylonitrile is run in from the dropping funnel over a period of three hours. The polymerisation temperature is kept at 60 to 63° C., by external cooling. After the monomers have been added, the mixture is stirred for another three hours at 63° C. in order to complete polymerisation.

1095 parts by weight of the graft polymer latex (350 parts by weight of graft polymer) are mixed with 1670 parts by weight of a 39% by weight copolymer latex (K value 60; intrinsic viscosity 0.65), obtained by the emulsion polymerisation of styrene and acrylonitrile in the weight ratio of 70:30. The mixture is coagulated, after the addition of 3.5 parts by weight of an anti-ager such as 2,2'-methylene - bis - 4 - methyl-6-cyclohexyl phenol, by adding the same volume of 1% by weight acetic acid and heating to 90° C. The coagulate is filtered off, washed and dried. The finely divided polymer is consolidated on a mixing roll at 170° C. to form a sheet which is then granulated. The granulate is then injection-moulded to form standard test bars whose physical properties are listed under 1 in Table I.

EXAMPLE 2

A graft polymer is prepared as described in Example 1, except that a polybutadiene latex with an average particle diameter $(d_{50})$ of $0.40\mu$ and $\Delta d_{10-90}=0.72$ is used.

The properties of the graft polymer mixture are given under 2 in Table I.

EXAMPLE 3

A graft polymer is prepared as described in Example 1, except that a polybutadiene latex with an average particle diameter $(d_{50})$ of $0.41\mu$ and $\Delta d_{10-90}=0.34$ is used.

The properties of the graft polymer mixture are given under 3 in Table I.

EXAMPLE 4

A graft polymer is prepared as described in Example 1, except that a polybutadiene latex with an average particle diameter $(d_{50})$ of $0.45\mu$ and $\Delta d_{10-90}=0.15$ is used.

The properties of the graft polymer mixture are given under 4 in Table I.

EXAMPLE 5

A graft polymer is prepared as described in Example 1, except that a polybutadiene latex with an average particle diameter of 0.39 and a distribution range of $\Delta d_{10-90}=0.06$ is used.

The properties of the graft polymer mixture are given under 5 in Table I.

TABLE I

| Example | 1 | 2 | 3 | 4 | 5 |
|---|---|---|---|---|---|
| Polybutadiene content of the end product (percent by weight) | 17.5 | 17.5 | 17.5 | 17.5 | 17.5 |
| $d_{50}$ in $\mu$ | 0.40 | 0.40 | 0.41 | 0.45 | 0.39 |
| $d_{10-90}$ | 1.22 | 0.72 | 0.34 | 0.15 | 0.06 |
| Notched impact strength in kg. cm./cm.$^2$ at +20° C. (DIN 53543) | 18.8 | 17.5 | 11.9 | 8.8 | 8.1 |
| Ball indentation hardness in kg./cm.$^2$ (DIN 53546) | 985 | 920 | 1,010 | 970 | 980 |

The table shows that considerably higher notched strengths are obtained when polybutadiene latices with a wide particle size distribution range are used to prepare the graft polymers.

EXAMPLE 6

This example illustrates the preparation and properties of a graft polymer, during the preparation of which all the styrene and acrylonitrile is polymerised in the presence of the polybutadiene latex.

As described in Example 1, 938 parts by weight of a 56% by weight polybutadiene latex with an average particle diameter $d_{50}=0.40\mu$ and $\Delta^d{}_{10-90}=1.22$ (525 parts by weight of polybutadiene) are diluted with 2547 parts by weight of salt-free water. The stirred mixture is heated to 60° C. after the addition of 26 parts by weight of the potassium salt of a dimerised linseed oil fatty acid (dimeric oleic acid) dissolved in 260 parts by weight of water, and 9 parts by weight of potassium persulphate dissolved in 300 parts by weight of water. Using two dropping funnels, (a) a mixture of 1370 parts by weight of styrene, 745 parts by weight of acrylonitrile and 7.8 parts by weight of tert.-dodecyl mercaptan and (b) a solution of 98 parts by weight of the aforementioned emulsifier dissolved in 980 parts by weight of water, are run into the mixture over a period of five hours. On completion of these additions, stirring is continued for another 3 hours at 65° C., at the end of which time polymerisation is almost complete. The resulting 39% by weight graft polymer latex is coagulated by adding an equivalent volume of 1% by weight acetic acid and heating to 80° C. The polymer is further processed and tested as in Example 1.

The graft polymer contains about 17.5% by weight of polybutadiene. It was found to possess the following properties:

Notched impact strength (DIN 53543) at +200° C.: 18.3 kp. cm./cm.$^2$

Ball indentation hardness (DIN 53546): 990 kp./cm.$^2$

EXAMPLE 7

As described in Example 1, a graft polymer is prepared from 1070 parts by weight of polybutadiene latex containing 600 parts by weight of polybutadiene, 420 parts by weight of styrene and 180 parts by weight of acrylonitrile. The polybutadiene latex is the same as that used in Example 1.

1095 parts by weight of the graft polymer are mixed with 1860 parts by weight of a 35% by weight emulsion copolymer latex of 70 parts by weight of α-methyl styrene and 30 parts by weight of acrylonitrile (K value 55), and the mixture is worked up as described in Example 1. The end product comprises 17.5% by weight of polybutadiene, 12.3% by weight of α-methyl styrene, 45.5% by weight of α-methyl styrene and 24.7% by weight of acrylonitrile.

It was found to possess the following properties:

Notched impact strength (DIN 53543) at 20° C.: 19.7 kp. cm./cm.$^2$

Ball indentation hardness (DIN 53546): 1010 kp./cm.$^2$

EXAMPLE 8

As described in Example 1, a graft polymer latex is prepared from 600 parts by weight of polybutadiene ($d_{50}=0.40\mu$, $\Delta d_{10-90}=1.22$), 420 parts by weight of styrene and 180 parts by weight of acrylonitrile.

1095 parts by weight of the resulting graft polymer latex are mixed with 1710 parts by weight of a 38% by weight copolymer latex of 70 parts by weight of methyl methacrylate and 30 parts by weight of acrylonitrile, and, following the addition of an anti-ager, the mixture is coagulated by the addition of 10% by weight sodium chloride solution. The coagulate is washed and dried. The end product is further processed and tested as in Example 1.

It comprises 17.5% by weight of polybutadiene, 12.3% by weight of styrene, 45.5% by weight of methyl methacrylate and 24.7% by weight of acrylonitrile.

The test specimens were found to possess the following properties:

Notched impact strength (DIN 53543) at 20° C.: 19.4 kp. cm./cm.$^2$

Ball indentation hardness (DIN 53546): 830 kp./cm.$^2$

Compositions containing 17.5% by weight of polybutadiene were selected for each of Examples 1 to 8 in order to demonstrate the preparation and the properties of the moulding compositions according to the invention.

The favourable properties listed above are by no means limited to this particular composition. Beyond a wide range from 5 to 60% by weight of butadiene polymer, the moulding compositions prepared with butadiene polymer latices of wide particle size distribution as the graft basis, exhibit higher notched impact strengths than those prepared with butadiene polymer latices of narrow particle size distribution.

What is claimed is:

1. The product based on
    (A) 5 to 60% by weight of a polybutadiene homopolymer in latex form, said latex having an average latex particle diameter or $d_{50}$ of 0.3 to 0.6$\mu$ and a particle size distribution over the range $\Delta d_{10-90}$ of more than about 0.3$\mu$, and
    (B) 95 to 40% by weight of a mixture of
        (a) styrene, α-methyl styrene, methyl methacrylate or mixtures thereof and
        (b) acrylonitrile, said mixture being in a ratio by weight of 90:10 to 50:50, said product being produced by emulsion polymerizing at least 80 parts by weight of said mixture of (a) and (b) based on 100 parts by weight of butadiene homopolymer in the presence of said butadiene homopolymer latex and then adding any remainder of said mixture of (a) and (b) as a copolymer to said product.

2. The product of claim 1 wherein said $\Delta d_{10-90}$ is more than about 0.5$\mu$.

References Cited

UNITED STATES PATENTS 3,170,964  2/1965  Grabowski _____ 260—876
3,287,443  11/1966  Saito et al. _____ 260—876

JAMES A. SEIDLECK, Primary Examiner

U.S. Cl. X.R.

260—876